Sept. 3, 1946.   F. H. WINTER   2,407,121
FIELD CONTROL SYSTEM FOR SYNCHRONOUS MACHINES
Filed Nov. 27, 1943
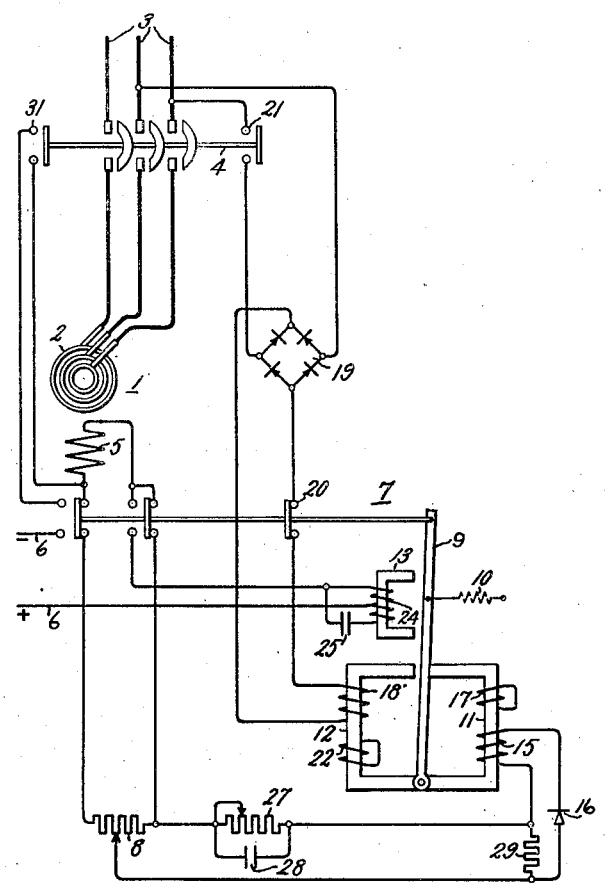
Inventor:
Fred H. Winter,
by Harry E. Dunham
His Attorney.

UNITED STATES PATENT OFFICE 2,407,121

FIELD CONTROL SYSTEM FOR SYNCHRONOUS MACHINES

Fred H. Winter, Schenectady, N. Y., assignor to General Electric Company, a corporation of New York Application November 27, 1943, Serial No. 511,974

10 Claims. (Cl. 171—118)

My invention relates to field control systems for synchronous machines and particularly to a system for effecting the application of field excitation to a synchronous motor so that it can synchronize its maximum load during a single slip cycle, thereby preventing the objectionable succession of current and torque fluctuations which occur when a synchronous motor is operating out of step, and for effecting a quick removal of field excitation when the motor falls out of step.

One object of my invention is to provide an improved arrangement of apparatus whereby the automatic application and removal of field excitation are effected by a single movable device.

Another object of my invention is to provide an improved arrangement of apparatus for effecting the application of field excitation to a synchronous machine which is simple in construction, cheap to manufacture and easily adjusted so as to effect the application of field excitation at the most desirable point in the slip cycle.

A further object of my invention is to provide an improved arrangement of apparatus for quickly effecting the removal of field excitation from a synchronous machine as soon as the motor starts to fall out of step.

My invention will be better understood from the following description when taken in connection with the accompanying drawing, the single figure of which diagrammatically illustrates a synchronous motor starting system embodying my invention, and the scope of my invention will be pointed out in the appended claims.

Referring to the drawing, 1 represents a synchronous motor having an armature winding 2, which is arranged to be connected to a suitable alternating current supply circuit 3 by means of a switch 4, which may be of any suitable type, examples of which are well known in the art. While I have shown a manually controlled line switch 4 for connecting the armature winding 2 to the alternating current supply circuit 3, it is obvious that any suitable automatic means may be employed for controlling the connections between the armature winding 2 and the supply circuit 3. Furthermore, in order to simplify the disclosure, I have shown an arrangement in which the motor is started as an induction motor by having the normal voltage of the alternating current supply circuit applied directly to the armature winding of the motor, but it will be obvious that any other well-known arrangement may be employed for starting the motor from rest and accelerating it to approximately synchronous speed.

The synchronous motor 1 is also provided with a field winding 5, which is arranged to be connected across a suitable source of excitation 6 when a two-position field switch 7 is in one of its positions and across the terminals of a suitable field discharge resistor 8 when the field switch 7 is in its other position.

In accordance with the preferred embodiment of my invention shown in the drawing, the field switch 7 comprises a movable member 9, shown as a hinged armature of suitable magnetic material, which is normally biased toward the open position of the switch by means of a spring 10 so that the armature closes the magnetic circuit of a U-shaped electromagnet 11. A second U-shaped electromagnet 12 is so positioned relative to the armature 9 that when the electromagnet 12 is energized it opposes the bias of the spring 10 and the force exerted by the electromagnet 11. Therefore, when the force of the electromagnet 12 predominates over the combined forces exerted by the spring 10 and the electromagnet 11, the movable member 9 moves away from the electromagnet 11 and toward the electromagnet 12, thereby increasing the reluctance of the electromagnet 11 and decreasing the reluctance of the electromagnet 12. A third electromagnet 13 is also so located that when it is energized it tends to hold the movable member 9 in the position to which it is arranged to be moved when the force of the electromagnet 12 predominates over the combined forces of the electromagnet 11 and the biasing spring 10, which position is the closed position of the field switch 7.

The electromagnet 11 is provided with an energizing winding 15, which is connected across a portion of the discharge resistor 8. A unidirectional current conducting device such as a half-wave rectifier 16 of any suitable type is connected in series with the winding 15 so that it is energized only by alternate half cycles of the slip frequency current that flows through the field winding 5 and the discharge resistor 8 when the motor is operating subsynchronously during the starting operation thereof. In order to prevent the flux in the magnetic circuit of the electromagnet 11 during each of the half cycles of induced field current that do not flow through the winding 15 from decreasing to a sufficiently low value to allow the movable member 9 to be moved to the switch closed position by the force exerted by the electromagnet 12 until the slip frequency has decreased below a predetermined value, the electromagnet 11 is also provided with a short-circuited winding 17 around a portion of its magnetic circuit.

The electromagnet 12 is provided with an energizing winding 18, which is arranged to be connected to a suitable direct current source 19 when both the field switch 7 is open so that its auxiliary contacts 20 are closed and the line switch 4 is closed so that its auxiliary contacts 21 are closed. As shown in the drawing, the direct current source 19 is a full-wave rectifier, the input circuit of which is connected across one phase of the alternating current supply circuit 3 when the auxiliary contacts 21 of the line switch 4 are closed and the output circuit of which is connected across the winding 18 when the auxiliary contacts 20 of the field switch 7 are closed. The electromagnet 12 is also provided with a short-circuited winding 22 around a portion of its magnetic circuit so that when the energizing winding 18 is deenergized a short time delay elapses before the flux in the magnetic circuit of the electromagnet 12 can decrease to a sufficiently low value to allow the biasing spring 10 to move the movable member 9 away from the electromagnet 12 and toward the open position of the field switch in which the movable member 9 is shown in the drawing. This time delay is made long enough to allow the electromagnet 13 to become energized and hold the movable member 9 in its switch closed position against the bias of the spring 10. The electromagnet 13 has an energizing winding 24, a portion of which, in the particular embodiment shown in the drawing, is connected in series with the direct current source of excitation 6 and the field winding 5 when the field switch is closed. A suitable condenser 25 is connected across the end terminals of the winding 24 so that when only direct current is flowing in the field circuit, only a portion of the winding 24 is energized by this direct current, but when the field switch 7 is closed and the motor is operating out of synchronism so that slip frequency current flows through the field winding 5 and the source of excitation 6 connected thereto, slip frequency current simultaneously flows in opposite directions through the two portions of the winding 24 so as to decrease the flux in the magnetic circuit of the electromagnet 13 quickly to a low enough value to allow the biasing spring 10 to restore the movable member 9 to the switch open position irrespective of the value of direct current excitation that may be flowing in the field winding prior to the machine falling out of step.

In order to adjust the slip at which the field switch 7 closes, I provide suitable means, such as an adjustable resistor 27, in series with the half-wave rectifier 16 and the energizing winding 15 of the electromagnet 11 for varying the amount of the total induced field current that flows through the energizing winding 15 during alternate cycles of each slip cycle. Since the operating winding 15 contains considerable inductance and the discharge resistor 8 is substantially non-inductive, the impedance of the branch circuit including the adjustable resistor 27 and the energizing winding 15 may be so high when the slip frequency is high that, at the instant of starting, sufficient current may not flow through the energizing winding 15 to maintain the movable member 9 in the switch open position against the force exerted by the electromagnet 12. Therefore, I provide a suitable condenser 28 in series in the branch circuit which includes the energizing winding 15 of the electromagnet 11 so as to reduce the inductance thereof at high values of slip to a sufficiently low value to allow enough current to flow through the energizing winding 15 to maintain the movable member in the switch open position. Preferably, this condenser 28 is connected in parallel with the adjustable resistor 27, and a loading resistor 29 is connected in parallel with the series connected half-wave rectifier 16 and the energizing winding 15. This condenser 28 also serves to advance the phase of the current through the energizing winding 15 relative to the current in the field winding 5 so that the operation of the field switch 7 is initiated prior to the point in the cycle of induced field current where the current in the negative direction reaches zero, which is substantially the optimum point during the slip cycle for applying field excitation to the motor.

The operation of the embodiment of my invention shown in the drawing is as follows: When it is desired to start the motor 1, the line switch 4 is closed so that the full voltage of the supply circuit 3 is applied to the armature winding 2 to start the motor from rest and accelerate it to approximately synchronous speed. During the starting operation of the motor, the field switch 7 is in the position shown so that the field discharge resistor 8 is connected across the terminals of the field winding 5. The closing of the auxiliary contacts 21 on the line switch 4 connects the input terminals of the full-wave rectifier 19 across two of the phase conductors of the supply circuit 3 so that the energizing winding 18 of the electromagnet 12 is energized by the output voltage of the rectifier 19. However, before the electromagnet 12 can exert enough force to move the movable member 9 to the switch closed position, the energizing winding 15 of the electromagnet 11 is sufficiently energized by a portion of the induced field current in the field winding 5 to exert in conjunction with the spring 10 enough force to maintain the movable member in the switch open position.

As is well known by those skilled in the art, when the motor 1 is operating subsynchronously, a voltage of slip frequency is induced in the field winding 5, and this voltage causes a current of slip frequency to flow through the field winding 5 and the discharge resistor 8. Also, a portion of this induced field current flows through the branch circuit which includes the resistor 27 and the condenser 28 in parallel and the resistor 29, and when the current in the branch circuit is in a predetermined direction, a portion of the branch current also flows through the half-wave rectifier 16 and the energizing winding 15 of the electromagnet 11. The electric constants of this branch circuit are so designed that at high slips the magnitude of the current that flows through the energizing winding 15 during alternate half cycles is sufficient to maintain the member 9 in the switch open position. Also, due to the condenser 28, the current in the branch circuit and through the energizing winding 15 is advanced in phase with respect to the main induced field current so that it decreases to zero before the induced current in the field winding 5 does.

Until the motor 1 reaches a predetermined speed near synchronous speed, the frequency and magnitude of the induced field current are such that the combined forces of the spring 10 and the electromagnet 11 predominate over the force exerted on the movable member 9 by the electromagnet 12. When, however, the motor reaches a predetermined speed, the frequency of the pulsating current through the winding 5 is low enough so that the half cycle of slip frequency current which does not flow through the winding 15 is sufficiently long to allow the pull of the electromagnet 11 to decrease to such a low value that the force of the electromagnet 12 predominates and causes the movable member 9 to move to the switch closed position. The field winding 5 is thereby disconnected from the field discharge resistor 8 and is connected in series with the winding 24 of the electromagnet 13 and the auxiliary contacts 31 on the line switch 4 to the source of excitation 6 so that the motor 1 is pulled into synchronism. The opening of the auxiliary contacts 20 on the field switch 7 interrupts the energizing circuit of the winding 18 of the electromagnet 12, but the short-circuited winding 22 delays the demagnetization of the electromagnet 12 for a sufficient length of time to allow the electromagnet 13 to become sufficiently energized to hold the field switch 7 in its closed position. Therefore, as long as the field winding 5 is supplied only with normal excitation current from the source of excitation 6, the field switch 7 is held in its closed position by the electromagnet 13.

In case the motor is pulled out of step for any reason, the induced field current of slip frequency during half of each slip cycle is in opposition to the direct current supplied by the source of excitation 6 so that during the first slip cycle the electromagnet 13 is deenergized sufficiently to allow the spring 10 to move the member 9 to the open switch position. While, in some cases, when the normal exciting current is low relative to the induced field current, the desired demagnetization of the electromagnet 13 can be effected during the first slip cycle without a condenser being connected across the winding 24, I find that more positive results are obtained by connecting such a condenser across the winding 24 and preferably across the winding so that the direct current excitation current flows through only a portion thereof, preferably one-half.

The opening of the field switch 7 in response to the motor pulling out of step restores the starting field circuit connections of the motor so that as soon as the motor is again running at the proper subsynchronous speed the field switch 7 is again automatically closed in the manner heretofore described to pull the motor into synchronism.

It will be observed that by merely adjusting the rheostat 27 the subsynchronous speed at which the field switch 7 closes can be varied and by varying the size of the condenser 28 the excitation can be applied at the most favorable point in the slip cycle of induced field current.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States:

1. For use with a synchronous motor having an armature winding and a field winding, means for supplying alternating current to said armature winding, and a source of excitation for said field winding, a device for controlling the connection between said source and said field winding comprising a movable armature member having a switch closed position and a switch open position, means normally biasing said member to the switch open position, an electromagnet associated with said member so as to exert thereon a force in a direction to maintain said member in the switch open position and having an energizing winding, means controlled by said movable member for connecting said energizing winding in circuit with said field winding when said member is in the switch open position, a second electromagnet associated with said member so as to exert thereon a force in a direction to move said member from the switch open position to the switch closed position and having an energizing winding, a source of direct current, means controlled by said member for effecting the energization of said last mentioned energizing winding from said source of direct current when said member is in the switch open position, and a third electromagnet associated with said member so as to exert thereon a force in a direction to maintain said member in the switch closed position and having an energizing winding, and means controlled by said member for connecting said last mentioned winding in series with said field winding and said source of excitation when said member is in the switch closed position.

2. For use with a synchronous motor having an armature winding and a field winding, means for supplying alternating current to said armature winding, and a source of excitation for said field winding, a device for controlling the connection between said source and said field winding comprising a movable armature member having a switch closed position and a switch open position, means normally biasing said member to the switch open position, means dependent upon the frequency of the current induced in said field winding when said motor is operating subsynchronously with the field winding disconnected from said source for effecting the movement of said member from the switch open position to the switch closed position against the force exerted by said biasing means, an electromagnet associated with said member so as to exert thereon a force in a direction to maintain said member in the switch closed position and having an energizing winding, and means controlled by said member for connecting said energizing winding in series with said field winding and said source of excitation when said member is in the switch closed position.

3. For use with a synchronous motor having an armature winding and a field winding, means for supplying alternating current to said armature winding, and a source of excitation for said field winding, a device for controlling the connection between said source and said field winding comprising a movable armature member having a switch closed position and a switch open position, means normally biasing said member to the switch open position, means dependent upon the frequency of the current induced in said field winding when said motor is operating subsynchronously with the field winding disconnected from said source for effecting the movement of said member from the switch open position to the switch closed position against the force exerted by said biasing means, an electromagnet associated with said member so as to exert thereon a force in a direction to maintain said member in the switch closed position and having an energizing winding, means controlled by said member for connecting said energizing winding in series with said field winding and said source of excitation when said member is in the switch closed position, and a condenser connected in parallel with said energizing winding.

4. For use with a synchronous motor having an armature winding and a field winding, means for supplying alternating current to said armature winding, and a source of excitation for said field winding, a device for controlling the connection between said source and said field winding comprising a movable armature member having a switch closed position and a switch open position, means normally biasing said member to the switch open position, means dependent upon the frequency of the current induced in said field winding when said motor is operating subsynchronously with the field winding disconnected from said source for effecting the movement of said member from the switch open position to the switch closed position against the force exerted by said biasing means, an electromagnet associated with said member so as to exert thereon a force in a direction to maintain said member in the switch closed position and having an energizing winding, means controlled by said member for connecting a portion of said last mentioned winding in series with said field winding and said source of excitation when said member is in the switch closed position, and a condenser connected across the terminals of said last mentioned winding.

5. For use with a synchronous motor having an armature winding and a field winding, an alternating current supply circuit, means for connecting said armature winding to said circuit, and a source of excitation for said field winding, a device for controlling the connection between said source and said field winding comprising a movable armature member having a switch closed position and a switch open position, means normally biasing said member to the switch open position, an electromagnet associated with said member so as to exert thereon a force in a direction to maintain said member in the switch open position and having an energizing winding, means controlled by said movable member for connecting said energizing winding in circuit with said field winding when said member is in the switch open position, a second electromagnet associated with said member so as to exert thereon a force in a direction to move said member from the switch open position to the switch closed position and having an energizing winding, a full-wave rectifier, means controlled by said connecting means for connecting the input circuit of said rectifier to said alternating current supply circuit, means controlled by said member for effecting the connection of the output circuit of said rectifier to said last mentioned energizing winding when said member is in the switch open position, and a third electromagnet associated with said member so as to exert thereon a force in a direction to maintain said member in the switch closed position and having an energizing winding, and means controlled by said member for connecting said last mentioned winding in series with said field winding and said source of excitation when said member is in the switch closed position.

6. For use with a synchronous motor having a field winding, a field discharge resistor connected to said field winding, and a source of excitation, a device for controlling the connection of said source to said field winding comprising an electromagnet having a short-circuited winding and an energizing winding connected in a branch circuit around a portion of said resistor, a half-wave rectifier connected in series with said energizing winding, a condenser connected in series with said energizing winding, an adjustable resistor connected in parallel with said condenser, and a fixed resistor connected in parallel with said series connected half-wave rectifier and energizing winding.

7. For use with a synchronous motor having a field winding and a source of excitation connected to said field winding, a device for controlling the connection of said source to said field winding and the disconnection of said source from said field winding comprising a movable armature member having a switch closed position and a switch open position, means normally biasing said member to the switch open position, means comprising a first electromagnet for effecting the movement of said member from the switch open position to the switch closed position against the force exerted by said biasing means, a second electromagnet associated with said member so as to exert thereon a force in a direction to maintain said member in the switch closed position, an energizing winding for said second electromagnet connected in series with said source and field winding, and a condenser connected in parallel with said energizing winding.

8. For use with a synchronous motor having a field winding and a source of excitation connected to said field winding, a device for controlling the connection of said source to said field winding and the disconnection of said source from said field winding comprising a movable armature member having a switch closed position and a switch open position, means normally biasing said member to the switch open position, means comprising a first electromagnet responsive to the frequency induced in said field winding when said motor is operating subsynchronously with said field winding disconnected from said source for effecting the movement of said member from the switch open to the switch closed position against the force exerted by said biasing means, a second electromagnet associated with said member so as to exert thereon a force in a direction to maintain said member in the switch closed position, a winding on said second electromagnet having a portion thereof connected in series with said source and field winding, and a condenser connected in parallel with said energizing winding.

9. For use with a synchronous motor having an armature winding and a field winding, an alternating current supply circuit, means for connecting said armature winding to said circuit, and a source of excitation for said field winding, a device for controlling the connection between said source and said field winding comprising a movable armature member having a switch closed position and a switch open position, means normally biasing said member to the switch open position, an electromagnet associated with said member so as to exert thereon a force in a direction to maintain said member in the switch open position and having an energizing winding, a unidirectional current conducting device, means controlled by said movable member for connecting said energizing winding in series with said field winding and said unidirectional current conducting device, a second electromagnet associated with said member so as to exert thereon a force in a direction to move said member from the switch open to the switch closed position and having an energizing winding, and means for energizing said last mentioned energizing winding while said connecting means is connecting said armature winding to said supply circuit.

10. For use with a synchronous motor having an armature winding and a field winding, an alternating current supply circuit, means for connecting said armature winding to said circuit, and a source of excitation for said field winding, a device for controlling the connection between said source and said field winding comprising a movable armature member having a switch closed position and a switch open position, means normally biasing said member to the switch open position, an electromagnet associated with said member so as to exert thereon a force in a direction to maintain said member in the switch open position and having an energizing winding, a unidirectonal current conducting device, means controlled by said movable member for connecting said energizing winding in with said field winding and said unidirectional current conducting device, a second electromagnet associated with said member so as to exert thereon a force in a direction to move said member from the switch open to the switch closed position and having an energizing winding, and means for energizing said last mentioned energizing winding while said connecting means is connecting said armature winding to said supply circuit and said member is in the switch open position.

FRED H. WINTER.